US012050776B2

(12) United States Patent
Huang et al.

(10) Patent No.: US 12,050,776 B2
(45) Date of Patent: Jul. 30, 2024

(54) APPARATUS WITH RESPONSE COMPLETION PACING

(71) Applicant: Micron Technology, Inc., Boise, ID (US)

(72) Inventors: Ying Huang, Boise, ID (US); Mark Ish, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 97 days.

(21) Appl. No.: 18/049,973

(22) Filed: Oct. 26, 2022

(65) Prior Publication Data

US 2023/0393750 A1    Dec. 7, 2023

Related U.S. Application Data

(60) Provisional application No. 63/347,929, filed on Jun. 1, 2022.

(51) Int. Cl.
*G06F 3/06* (2006.01)
(52) U.S. Cl.
CPC .......... *G06F 3/0613* (2013.01); *G06F 3/0611* (2013.01); *G06F 3/0659* (2013.01); *G06F 3/0679* (2013.01)
(58) Field of Classification Search
CPC ........ G06F 3/06; G06F 3/0613; G06F 3/0679; G06F 3/0611; G06F 3/0659
See application file for complete search history.

(56) References Cited

U.S. PATENT DOCUMENTS

| 11,567,700 | B2 * | 1/2023 | La Fratta | G06F 3/0683 |
| 11,922,228 | B2 * | 3/2024 | Weckwerth | G06F 1/10 |
| 2007/0174511 | A1 * | 7/2007 | Yu | G06F 13/28 |
| | | | | 710/36 |
| 2021/0200467 | A1 * | 7/2021 | Magro | G06F 12/0238 |

FOREIGN PATENT DOCUMENTS

WO    WO-2022017628 A1 *   1/2022   ............. G06F 13/28

OTHER PUBLICATIONS

Y. S. Hanay, A. Dwaraki and T. Wolf, "High-performance implementation of in-network traffic pacing," 2011 IEEE 12th International Conference on High Performance Switching and Routing, Cartagena, Spain, 2011, pp. 9-15.*

* cited by examiner

*Primary Examiner* — Pierre Michel Bataille
(74) *Attorney, Agent, or Firm* — Perkins Coie LLP

(57) ABSTRACT

Methods, apparatuses and systems related to response completion pacing for latency control are described. The apparatus may utilize response completion pacing to dynamically control timing of output communications to the host. In some embodiments, the memory device can include a ready response queue that temporarily stores the data retrieved from a backend portion or a storage portion of the memory device. The apparatus can include logic coupled to the ready response queue and configured to communicate/send the data in the ready response queue according to a cadence period. In some embodiments, the logic can further dynamically adjust a storage capacity of the ready response queue and/or the cadence period.

20 Claims, 5 Drawing Sheets

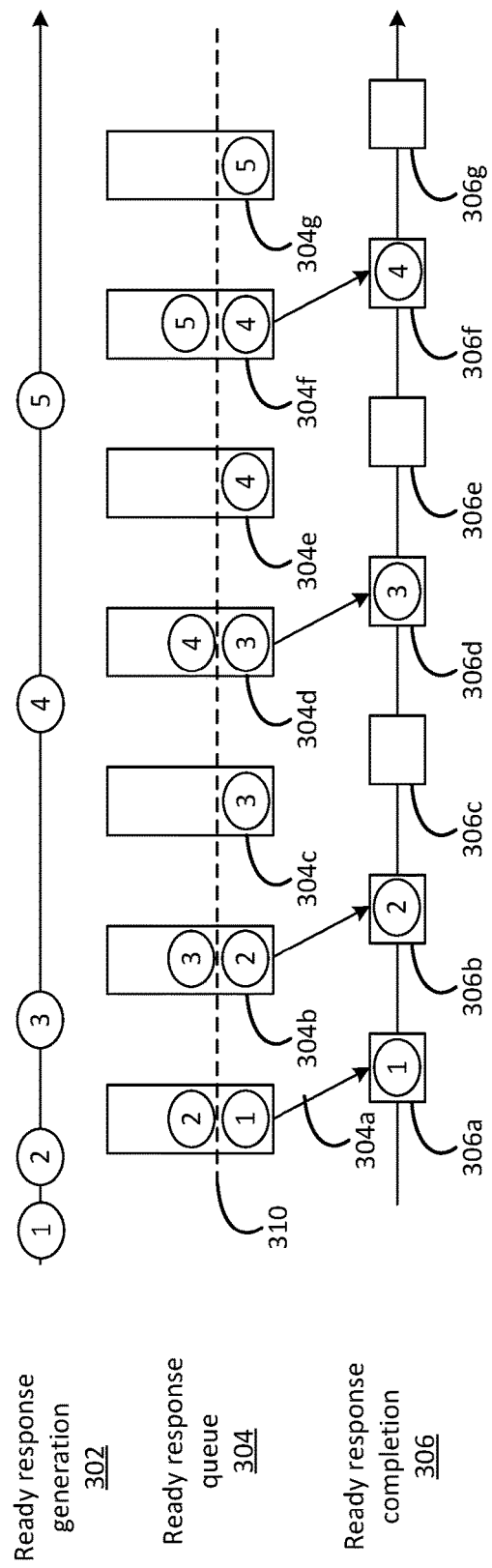
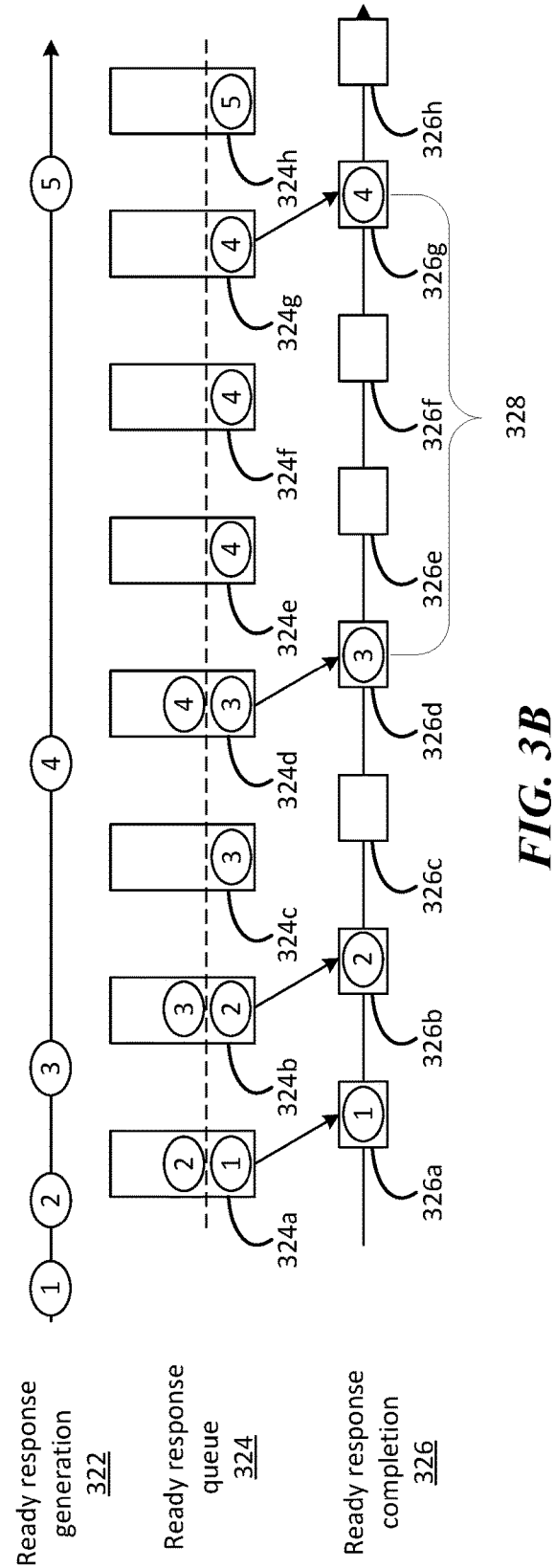
FIG. 3A
FIG. 3B

APPARATUS WITH RESPONSE COMPLETION PACING

CROSS-REFERENCE TO RELATED APPLICATION(S)

This application claims benefit of U.S. Provisional Application No. 63/347,929, filed Jun. 1, 2022; which is incorporated herein by reference in its entirety.

TECHNICAL FIELD

The disclosed embodiments relate to devices, and, in particular, to semiconductor memory devices with response completion pacing for latency control.

BACKGROUND

Memory systems can employ memory devices to store and access information. The memory devices can include volatile memory devices, non-volatile memory devices (e.g., flash memory), or a combination device. The memory devices utilize electrical energy, along with corresponding threshold levels or processing/reading voltage levels, to store and access data. With technological advancements in various areas and increasing applications, the market is continuously looking for faster, more efficient, and smaller devices. To meet the market demand, the memory devices are being pushed to the limit. However, attempts to increase the operating speed and/or to decrease the circuit size often create other issues, such as degraded signal qualities, increased noise, and decreased consistencies in circuit performance. In view of the ever-increasing commercial competitive pressures, along with growing consumer expectations and the desire to differentiate products in the marketplace, it is increasingly desirable that answers be found to these problems. Moreover, the need to reduce costs, improve efficiencies and performance, and meet competitive pressures adds an even greater pressure to find answers to these problems.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 3A is an illustration of completion response management maintaining a target number of ready responses in a queue, in accordance with an embodiment of the present technology.

FIG. 3B is an illustration of completion response management maintaining a target number of ready responses in a queue and maintaining a maximum gap between responses, in accordance with an embodiment of the present technology.

DETAILED DESCRIPTION

Figure 1:
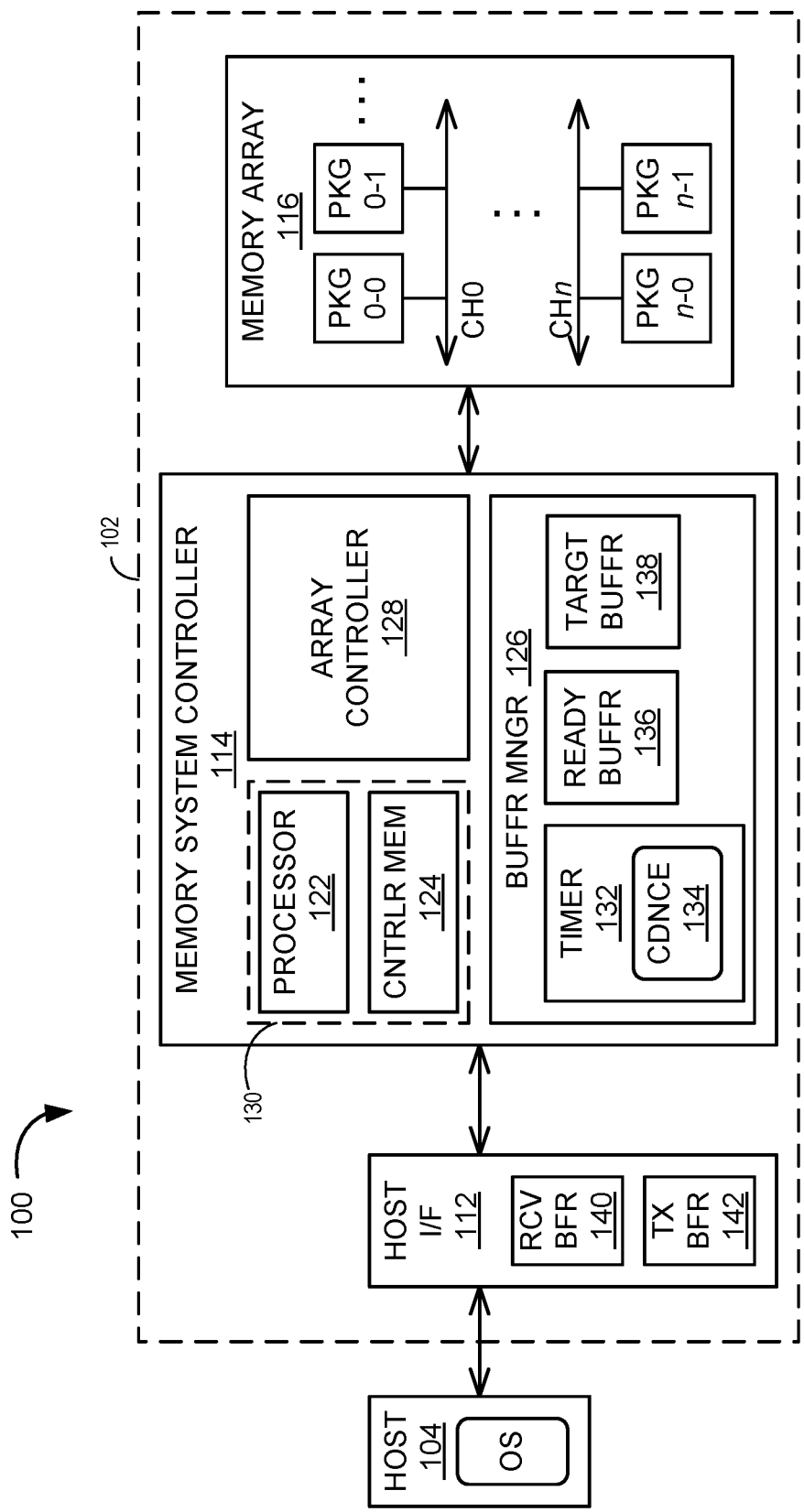
FIG. 1 is a block diagram of a computing system in accordance with an embodiment of the present technology.

As described in greater detail below, the technology disclosed herein relates to an apparatus, such as memory systems, systems with memory devices, related methods, etc., for managing response completion pacing. A computing system, such as an enterprise computer, a server, a distributed computing system, or the like, may include a memory device configured to store and retrieve data. The memory device can receive commands from a host device and operate according to the commands. The memory device may require different durations to complete the operations, such as due to different access times or bus traffic loads in retrieving data from a commanded read location. The different durations can increase latency and negatively affect quality of service (QoS) measures. For example, the memory device may face increased worst-case performance measures or higher average response times for certain command sequences. To improve the overall latency performance, embodiments of the technology described herein may utilize response completion pacing to dynamically control timing of output communications (e.g., completion notification) to the host. In some embodiments, the memory device can include a ready response queue that temporarily stores the responses from the system. The memory device can include logic coupled to the ready response queue and configured to communicate/send the data in the ready response queue according to a cadence period. In some embodiments, the logic can further dynamically adjust a storage capacity of the ready response queue (e.g., a number of response outputs stored therein) and/or the cadence period. For example, the memory device can delay communication of a response output to the host device to achieve a predictable and a more reliable output pacing of communications with the host device.

In some embodiments, the memory device can maintain a ready response first-in-first-out (FIFO) queue to hold the responses for the completed commands. When the pacing logic timer expires, the memory device can send a response from the ready response queue to the host (via, e.g., a completion response queue). To maintain a targeted performance for maintaining the QoS (e.g., targeted latency), the memory device can reference a targeted number of responses to be maintained in the ready response queue. The memory device can determine the target number of responses in the queue based on a predetermined time gap between each response in the queue, a command queue depth, and the cadence period. The memory device can adjust the cadence period, the number of responses in the queue, and/or the garbage collection operation in order to maintain the targeted performance for maintaining the QoS.

As described in detail below, embodiments of the present technology can provide technical advantages over conventional technology and include circuits/functions to 1) incorporate latency control into the rate control flow; 2) provide a systemic way to maintain control of the latency metrics; 3) improve the current rate control design to allow for the best performance supportable by given QoS budgets; and 4) utilize a hardware pacing design and with limited extra firmware complexity. For illustrative purposes, the memory system will be described using a single response queue of a single apparatus. However, it is understood that the memory system can be extended to multiple queues to support multiple virtual devices that have different latency needs.

Example Environment

FIG. 1 is a block diagram of a computing system 100 in accordance with an embodiment of the present technology. The computing system 100 can include a personal computing device/system, an enterprise system, a mobile device, a server system, a database system, a distributed computing system, or the like. The computing system 100 can include a memory system 102 coupled to a host device 104. The host device 104 can include one or more processors that can write data to and/or read data from the memory system 102, such as during execution of an operating system. For example, the host device 104 can include an upstream central processing unit (CPU).

The memory system 102 can include circuitry configured to store data (via, e.g., write operations) and provide access to stored data (via, e.g., read operations). For example, the memory system 102 can include a persistent or non-volatile data storage system, such as a NAND-based Flash drive system, a Solid-State Drive (SSD) system, a SD card, or the like. In some embodiments, the memory system 102 can include a host interface 112 (e.g., buffers, transmitters, receivers, and/or the like) configured to facilitate communications with the host device 104. For example, the Host interface 112 can be configured to support one or more host interconnect schemes, such as Universal Serial Bus (USB), Peripheral Component Interconnect (PCI), Serial AT Attachment (SATA), or the like. The host interface 112 can receive commands, addresses, data (e.g., write data), and/or other information from the host device 104. The host interface 112 can also send data (e.g., read data) and/or other information to the host device 104.

The memory system 102 can further include a memory system controller 114 and a memory array 116. The memory array 116 can include memory cells that are configured to store a unit of information. The memory system controller 114 can be configured to control the overall operation of the memory system 102, including the operations of the memory array 116.

In some embodiments, the memory array 116 can include a set of NAND Flash devices or packages. Each of the packages can include a set of memory cells that each store data in a charge storage structure. The memory cells can include, for example, floating gate, charge trap, phase change, ferroelectric, magnetoresitive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate a threshold voltage (Vt) of the cell. For example, a single level cell (SLC) can be programmed to a targeted one of two different data states, which can be represented by the binary units 1 or 0. Also, some flash memory cells can be programmed to a targeted one of more than two data states. Multilevel cells (MLCs) may be programmed to any one of four data states (e.g., represented by the binary 00, 01, 10, 11) to store two bits of data. Similarly, triple level cells (TLCs) may be programmed to one of eight (i.e., $2^3$) data states to store three bits of data, and quad level cells (QLCs) may be programmed to one of 16 (i.e., $2^4$) data states to store four bits of data.

Such memory cells may be arranged in rows (e.g., each corresponding to a word line 143) and columns (e.g., each corresponding to a bit line). The arrangements can further correspond to different groupings for the memory cells. For example, each word line can correspond to one or more memory pages. Also, the memory array 116 can include memory blocks that each include a set of memory pages. In operation, the data can be written or otherwise programmed (e.g., erased) with regards to the various memory regions of the memory array 116, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

While the memory array 116 is described with respect to the memory cells, it is understood that the memory array 116 can include other components (not shown). For example, the memory array 116 can also include other circuit components, such as multiplexers, decoders, buffers, read/write drivers, address registers, data out/data in registers, etc., for accessing and/or programming (e.g., writing) the data and for other functionalities.

As described above, the memory system controller 114 can be configured to control the operations of the memory array 116. The memory system controller 114 can include a processor 122, such as a microcontroller, special purpose logic circuitry (e.g., a field programmable gate array (FPGA), an application specific integrated circuit (ASIC), etc.), or other suitable processor. The processor 122 can execute instructions encoded in hardware, firmware, and/or software (e.g., instructions stored in controller embedded memory 124 to execute various processes, logic flows, and routines for controlling operation of the memory system 102 and/or the memory array 116.

In controlling the operations of the memory system 102, the memory system controller 114 (via, e.g., the processor 122 and the embedded memory 124) can implement a Flash Translation Layer (FTL) 130. The FTL 130 can include a set of functions or operations that provide translations for the memory array 116 (e.g., the Flash devices therein). For example, the FTL 130 can include the logical-physical address translation, such as by providing the mapping between virtual or logical addresses used by the operating system to the corresponding physical addresses that identify the Flash device and the location therein (e.g., the layer, the page, the block, the row, the column, etc.). Also, the FTL 130 can include a garbage collection function that extracts useful data from partially filed units (e.g., memory blocks) and combines them to a smaller set of memory units. The FTL 130 can include other functions, such as wear-leveling, bad block management, concurrency (e.g., handling concurrent events), page allocation, error correction code (e.g., error recovery), or the like.

In some embodiments, the memory system controller 114 can include a buffer manager 126 configured to control and/or oversee information exchanged with the host device 104. The buffer manager 126 can interact with the host interface 112 regarding operations of receiving and/or transmitting buffers (e.g., receiving buffer 140 and transmitting buffer 142) therein. For example, the buffer manager 126 can determine the number of received commands stored in the receiving buffer 140 and coordinate the processing of such received commands. Also, the buffer manager 126 can coordinate the transmission of responses to the host 104 via control of the transmitting buffer 142. As described in detail below, the buffer manager 126 can control a flow or a timing of transmission to the host 104 by controlling a flow or a timing of data transfer from the memory array 116 to the host interface 112.

The buffer manager 126 can include timer 132 (with cadence 134), ready buffer 136, and target buffer 138. Timer 132 can control a pacing logic timer for responses and the time gap between responses in the ready response queue. The time gap can be treated as a proxy for measuring how fast the memory system 102 can process one command. Cadence 134 can represent the timing (e.g., output pacing period) at which data is communicated/sent from the ready response queue to the host 104. For example, when the pacing logic timer expires, the memory system 102 can send a response from the ready response queue to the host 104. The pacing logic timer can be configured, via the processor 122 and/or the buffer manager 126, to count down from or up to a threshold number that corresponds to the cadence 134. The pacing logic timer can track a cadenced duration for periodically sending command responses to the host 104.

The processor 122 and/or the buffer manager 126 can control the ready buffer 136 to adjust the number of responses stored in the ready response queue. By controlling the number of responses in the ready response queue, the ready buffer 136 can ensure there are enough ready responses in the queue that can provide completion responses at a cadence to host 104. The processor 122 and/or the buffer manager 126 can control the target buffer 138 to manage the targeted number of responses to be maintained in the ready response queue. In some implementations, the target number of responses is based on a predetermined time gap between each response, a command queue depth, and the response cadence. With control of the ready response queue and with setting of pacing period, the buffer manager 126 can control output communications to host 104 to meet a target latency.

Further, the memory system controller 114 can include an array controller 128 that controls or oversees detailed or targeted aspects of operating the memory array 116. For example, the array controller 128 can provide a communication interface between the processor 122 and the memory array 116 (e.g., the components therein). The array controller 128 can function as a multiplexer/demultiplexer, such as for handling transport of data along serial connection to flash devices in the memory array 116.

Figure 2A:
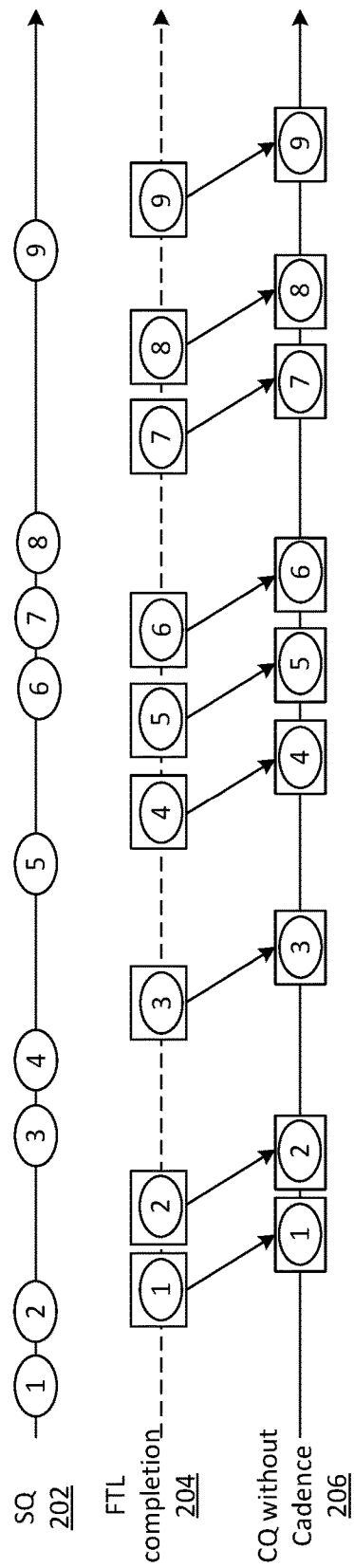
FIG. 2A is an illustration of queue depth latency without cadence, in accordance with an embodiment of the present technology.

FIG. 2A is an illustration of queue depth latency without cadence, in accordance with an embodiment of the present technology. The memory system 102 (via, e.g., host interface 112 of FIG. 1) can receive commands from the host 104 of FIG. 1 and operate according to the commands. FIG. 2A illustrates commands 1-9 in the submission queue (SQ) 202 (corresponding to, e.g., the receiving buffer 140 of FIG. 1). The memory system 102 can process the commands in the SQ 202 in a sequential manner. For example, the memory system 102 can perform the read operation, the write operation, or the like according to the corresponding commands 1-9 received through the receiving buffer 140.

The memory system 102 can store the data retrieved from a backend portion or a storage portion of the memory device in a ready response queue, illustrated in the flash translation layer (FTL) completion 204. In other words, the FTL completion 204 can correspond to responses generated by the FTL (after it has completed processing the command) in as results of performing the corresponding commands. When responding to the command, the memory system 102 can send the response data to the host 104 according to a completion queue (CQ) output timing 206. Without a cadence to pace the output data, the responses are scattered, as illustrated by responses 1-9 in the CQ output timing 206. In other words, without the cadence control, the memory system 102 can send the CQ output immediately, such as by processing and/or sending the responses from the backend portion immediately and without introducing any intentional delays.

Figure 2B:
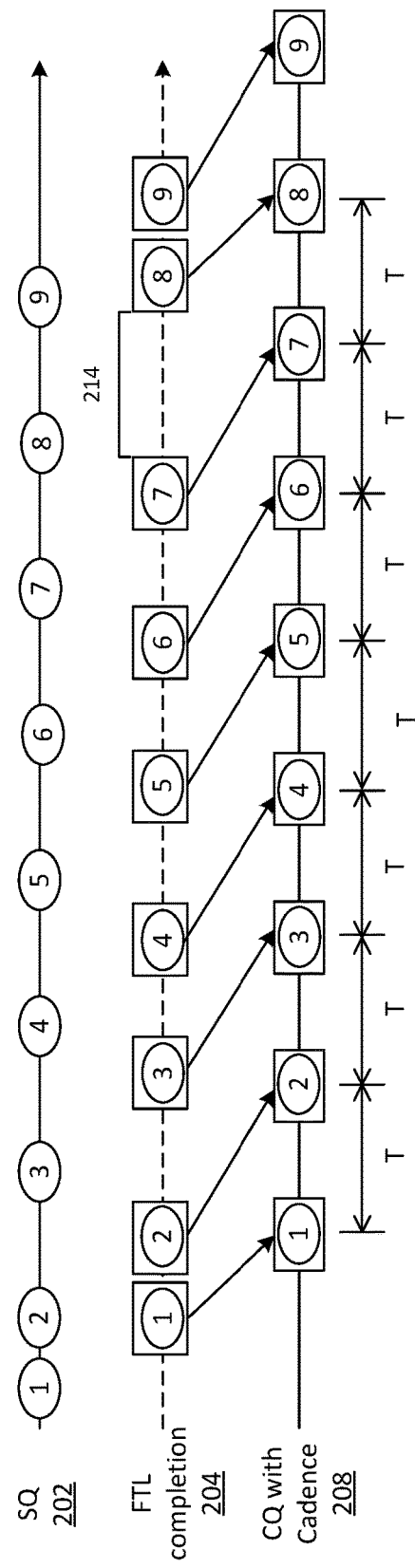
FIG. 2B is an illustration of queue depth latency with cadence, in accordance with an embodiment of the present technology.

FIG. 2B is an illustration of queue depth latency with cadence in accordance with an embodiment of the present technology. The memory system 102 (via, e.g., host interface 112) can receive commands from the host 104 via the SQ 202 and operate according to the commands to generate the FTL completion 204 as described above. The memory system 102 can store the data retrieved from a backend portion or a storage portion of the memory device in a ready response queue. When sending the responses to the command, the memory system 102 sends the response data to the host 104 via a completion queue (CQ) output timing 212. The memory system controller 114 can control the cadence 134 and thus the pacing of the output completion response (illustrated by responses 1-9 according to the CQ output timing 212). The memory system 102 can use the cadence 134 to send an output (e.g., FTL completion data) according to a time period T that corresponds to the cadence 134. As illustrated, cadence timing for the output data can hide the gap 214 between response 7 and 8 in the FTL completion 210. Also, the memory system 102 may delay sending response 2 by nearly an additional time period T according to the cadence control. In other words, the cadence control can be used to adjust the dynamically created and unpredictable gaps that occur between backend processing operations. Accordingly, the memory system 102 can provide a more predictable and controlled timing for transmitting the responses to the host 104.

If there are insufficient responses in the queue (e.g., as defined by a predetermined or a dynamically determined queue length) to meet a target latency, rather than increase the cadence period to reduce the requirement on number of queued response, the memory system 102 can maintain the same cadence period and delay (illustrated in FIGS. 3A and 3B) sending responses and build up the number of queued responses. Depending on the number of queued responses, the memory system 102 can introduce gaps as long as the maximum targeted performance for maintaining the QoS is not exceeded. In controlling the output data sent to the host 104, the memory system 102 can control the timing of the next incoming command from the host 104. Accordingly, the memory system 102 can reduce the worst-case response times (e.g., worst-case delays between commands and responses), thereby controlling the overall QoS measure.

FIG. 3A is an illustration of completion response management maintaining a target number of ready responses in a queue, in accordance with an embodiment of the present technology. After receiving commands from the host 104, the memory system 102 can generate response data (illustrated by ready response generation 302 with responses 1-5) and store the data retrieved from a backend portion or a storage portion of the memory system 102 in a ready response queue 304 (e.g., the ready buffer 136 of FIG. 1). As illustrated in FIG. 3A, responses 1-5 are arranged in the ready response queue 304 with at least a target number 310 (e.g., minimum number of responses maintained in the queue) of one response in the queue (as shown in queue 304$c$, 304$e$, and 304$g$). To maintain a targeted performance for maintaining the QoS (e.g., targeted latency), the memory system 102 can reference a targeted number of responses (e.g., one response for FIG. 3A illustration) to be maintained in the ready response queue 304. For example, at response completion 306, the memory system 102 disallows responses or withholds transmission of ready responses at output timings 306c, 306e, and 306g in order to maintain the target number of ready responses of one response in ready response queue at 304c, 304e, and 304g. The memory system 102 allows response completion at 306a, 306b, 306d, and 306f since there are two responses in queue 304a, 304b, 304d, and 304f. In other words, the memory system 102 (via, e.g., the processor 122 of FIG. 1 and/or the buffer manager 126 of FIG. 1) can introduce an intentional delay by withholding transmission of a ready response at a transmission timing (according to, e.g., the cadence 134 of FIG. 1) when the number of responses in the ready response queue 304 is equal to or less than the target number.

FIG. 3B is an illustration of completion response management maintaining a target number of ready responses in a queue and maintaining a maximum gap between responses, in accordance with an embodiment of the present technology. After receiving commands from the host 104, the memory system 102 can generate response data (illustrated by ready response generation 322 with responses 1-5) and store the data retrieved from a backend portion or a storage portion of the memory system 102 in a ready response queue 324 (e.g., the ready buffer 136 of FIG. 1). As illustrated in FIG. 3B, responses 1-5 are arranged in the ready response queue 324 with a target number (e.g., minimum number of responses maintained in the queue) of one response in the queue (as shown in queue 324c, 324e, 324f, 324g, and 324h). To maintain a targeted performance for maintaining the QoS, the memory system 102 can reference a targeted number of responses (e.g., one response for FIG. 3B illustration) to be maintained in the ready response queue 324. For example, at response completion 326, the memory system 102 disallows responses at 326c, 326e, 326f, and 326h in order to maintain the target number of ready responses of one response in ready response queue 324c, 324e, 324f, and 324h. The memory system 102 allows response completion at 326a, 326b, and 326d since there are two responses in queue 324a, 324b, and 324d. Additionally, the system memory 102 allows completion at 326g to avoid exceeding the allowed maximum gap 328.

Figure 4:
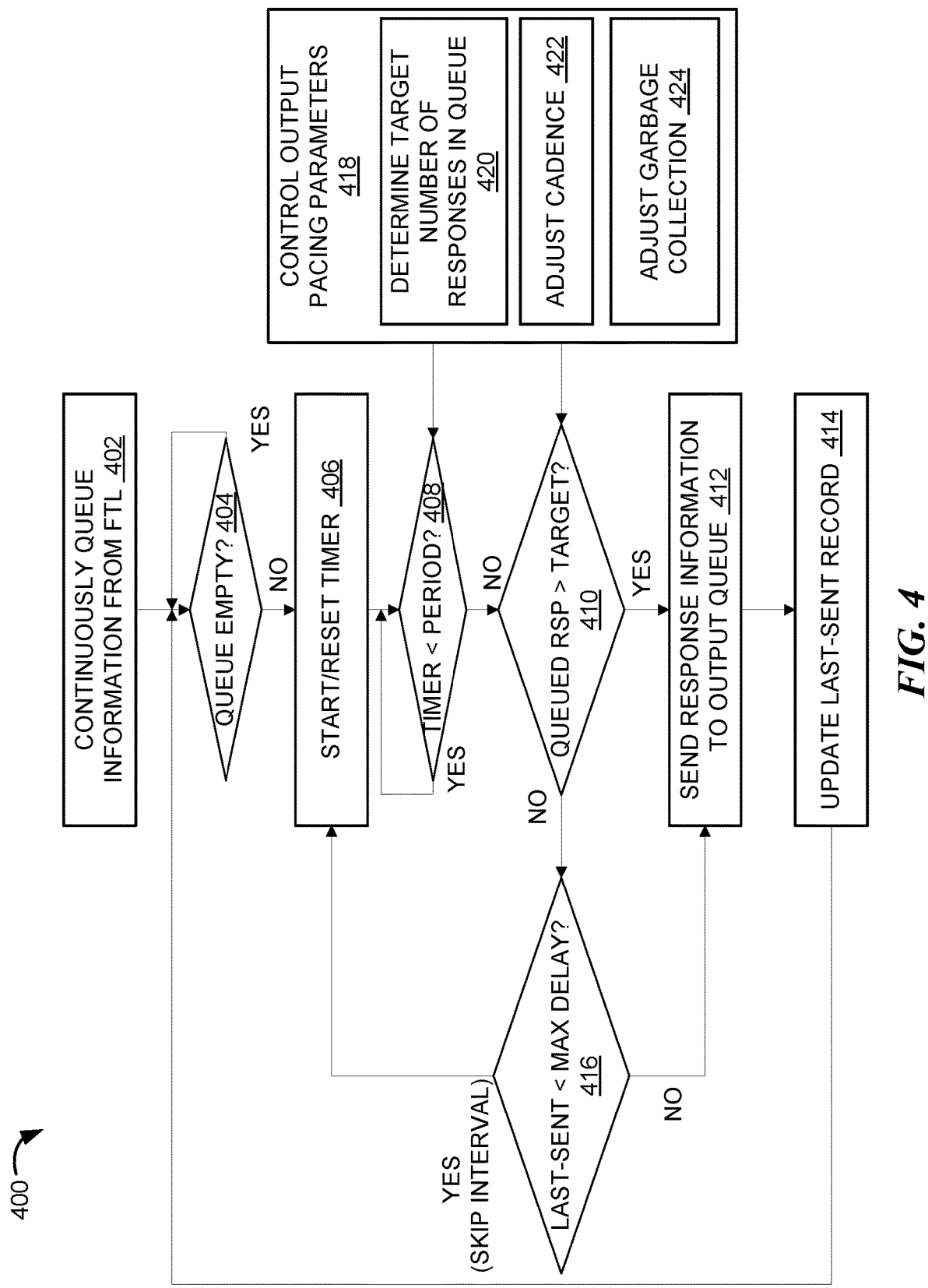
FIG. 4 is a flow diagram illustrating an example method of operating an apparatus in accordance with an embodiment of the present technology.

FIG. 4 is a flow diagram illustrating an example method 400 of operating an apparatus (e.g., the computing system 100, the memory system 102, and/or the memory system controller 114, all illustrated in FIG. 1) in accordance with an embodiment of the present technology. The method 400 can be for computing and implementing response completion pacing for latency control.

The apparatus can receive commands from a host device and operate according to the received commands. The apparatus can maintain the ready buffer 136 of FIG. 1 (e.g., a ready response FIFO queue) that temporarily stores the responses (e.g., data retrieved from a backend portion or a storage portion (e.g., NAND chips)) for the completed commands. At block 402, the apparatus can continuously queue (by, receiving and temporarily storing) response information (e.g., in the ready response queue) from the FTL to respond to the commands. At block 404, the apparatus can determine whether the queue is empty. If the queue is empty, the apparatus can continue to wait for response information (at block 402).

If the queue is not empty, at block 406, the apparatus can start a timer (e.g., pacing logic timer) to use to output communications (e.g., completion response) to the host according to a cadence period. The timer can be used to measure the pacing duration/period (T) between sending the responses in the ready response FIFO to the transmission buffer 142 of FIG. 1.

At block 408, the memory system 102 can determine whether the timer is less than the cadence period. If the timer is less than the cadence period, the apparatus can continue to monitor the timer. When the timer is not less than the cadence period, at block 410, the apparatus can determine whether the number of queued responses is greater than the target number of queued responses. When the number of queued responses is greater than the target number of queued responses, at block 412, the apparatus can send response information to the output queue. For example, when the pacing logic timer expires at the end of period T, the apparatus receives a notification and sends a response from the ready queue (e.g., the ready buffer 136) to the completion queue (e.g., the transmission buffer 142). Sending the response from the ready queue to the completion queue, can occur any time before the next time-out, which allows the pacing logic to send the response completion at the next time slot.

In some embodiments, when the number of queued responses is less than or equal to the target number of queued responses (e.g., target buffer length 138), at block 416, the apparatus can determine whether the gap between the previously sent response and the current time is less than the maximum allowed time gap (max delay, such as a predetermined delay time) between responses. If the number of queued responses is less than or equal to the target number of queued responses and the gap between the previously sent response and the current time is less than the maximum allowed gap, the apparatus can skip sending a response from the ready queue to the completion queue (by, e.g., holding the data within the buffer and bypassing the output timing at the end of the period T) and reset the timer at block 406. Response completion 326e and 326f of FIG. 3B illustrate the apparatus skipping to send the response information to the completion queue.

If the number of queued responses is less than or equal to the target number of queued responses and the gap between the previously sent response and the current time is not less than the maximum allowed gap, at block 412, the apparatus can send a response information to the output queue (completion queue). In other words, the memory system 102 can provide an output (by, e.g., transferring the output from the ready queue to the completion queue) when the number of timer expirations (e.g., after n number of periods T) reaches a maximum and regardless of the number of responses stored in the ready queue. Response completion 326g of FIG. 3B illustrate the apparatus sending the response information to the completion queue when the number of queued responses is less than or equal to the target number of queued responses and the gap between the previously sent response and the current time is not less than the maximum allowed gap 328. FIGS. 3A and 3B illustrate maintaining a target number of ready responses in a queue and maintaining a maximum gap between responses. The apparatus can record and track by a counter the occurrence of skipping sending a response to the completion queue or the occurrence of sending a response to the completion queue.

At block 414, the apparatus can update the last sent record, continue to monitor the queue, and/or make adjustments to maintain a desired number of responses in the queue to meet the targeted performance for maintaining the QoS. For example, the apparatus can collect statics of the ready response queue (such as cadence period, the target number of queued responses, and/or the average, maximum and minimum number of ready responses) and feed the statistics into the drive's rate control logic (e.g., the processor 122 and/or the buffer manager 126) for possible rate and target number of queued responses adjustments. In a first example, the apparatus can increase the target number of queued responses, if the number of occurrences of the maximum gap between two responses exceeds a threshold. In a second example, the apparatus can increase the cadence period, if the number of occurrences of the maximum gap between two responses exceeds a threshold. In a third example, the apparatus can decrease the target number of queued responses, if the number of occurrences of the maximum gap between two responses drops below a threshold. The memory system 102 can update the last sent record by resetting the counter used to track the skipped response periods.

The apparatus can manage the rate control for a target latency (e.g., Nx latency number at a certain input/output operations per second (IOP)). The apparatus can retrieve (e.g., via profiling or maintained in a table) the current host IOP, the host rate, the cadence period, the maximum completion gap (in terms of the targeted N9 latency) between two completion responses for the current host IOP, and the queue depth. The apparatus can update the target number of queued responses or update the maximum completion gap based on the queue depth and the pre-determined target latency. The apparatus can collect statics of the ready response queue to determine if the current target number of queued responses and/or cadence need to be adjusted. In some embodiments, the maximum time gap can be less than the cadence period ($T_c$) multiplied by the expectation of the number of responses (N) in the queue (e.g., $E[N]*(T_c)$, $E[\ ]$ representing expectation of a random variable)

At block 418, the apparatus can control output pacing parameters for responses in the queue. The memory system 102 can control the output pacing parameters based on maintaining the maximum time gap between the responses (Max(G), Max ( ) representing a maximum of a random variable) below the expected number of responses in the queue ($E[N]*(T_c)$) (e.g., $Max(G)<E[N]*(T_c)$ or a derivative thereof). At block 420, the apparatus can determine the target number of responses in the queue. The target number of responses in the queue ($N_t$) can be based on the maximum time gap between responses (Max(G)) in the queue divided by the cadence period ($T_c$)

$$\left(e.g., Nt = \frac{\text{Max}(G)}{Tc}\right).$$

Other ways of determining the target number of responses in the queue are possible as long as the target number of responses guards against the maximum gap between responses causing latency values outside of the targeted latency. If the target number of responses in the queue is greater than or equal to the command queue depth, (at block 422) the apparatus can increase the cadence period since there are not enough responses stored in the queue. If the target number of responses in the queue is greater than current number of queued responses, the apparatus can increase number of queued responses (in order to keep the same IOP level) or increase the cadence period to decrease the target number of response in the queue. At the same IOP level, since the target number of queued responses in less than the command queue depth, a larger command queue can support a greater maximum timer gap between responses due to a larger range of possible target number of queued response.

If the target number of queued responses is less than the current number of queued responses, the apparatus can increase the performance of the host by reducing the cadence period and/or by reducing the speed of command processing to allow garbage collection (at block 424) to operate without impacting host latency numbers. At block 424, the apparatus can determine a reference host IOP level based on parameters such as the garbage collection performance, the current free space in the drive, the current workload of the apparatus, a predefined free space target, physical valid data count rate for garbage collection victims, and/or the garbage collection progress measured by pages worked by garbage collection. If the host rate is less than the reference host IOP level, the reference host IOP level is supportable by the garbage collection process. If the host rate is greater than the reference host IOP level, the reference host IOP level is not supportable by the garbage collection process, and the apparatus can set the reference host IOP level equal to the host rate. The apparatus can determine if the garbage collection performance can be raised, and if so, the apparatus can increase the garbage collection rate by a predefined amount. In some embodiments, the apparatus can determine whether the host IOP level is low compared with the host rate. If the host rate is less than a predefined threshold rate, the apparatus can determine if the garbage collection rate is below a threshold. The apparatus can adjust the garbage collection rate based on the threshold. The apparatus can determine if there is enough current free space in the drive based on a targeted free space. In some cases, the apparatus can set a flag for a garbage collection pause.

Figure 5:
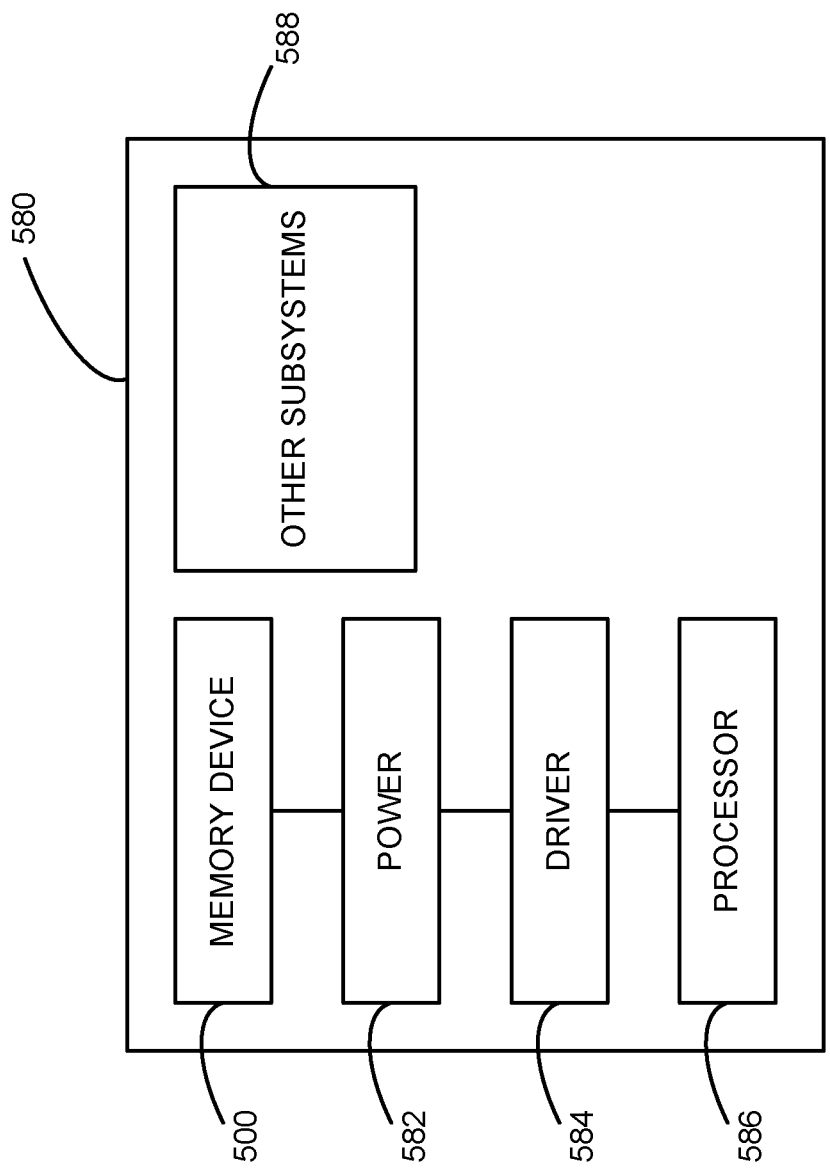
FIG. 5 is a schematic view of a system that includes an apparatus in accordance with an embodiment of the present technology.

FIG. 5 is a schematic view of a system that includes an apparatus in accordance with embodiments of the present technology. Any one of the foregoing apparatuses (e.g., memory devices) described above with reference to FIGS. 2-5 can be incorporated into any of a myriad of larger and/or more complex systems, a representative example of which is system 580 shown schematically in FIG. 5. The system 580 can include a memory device 500, a power source 582, a driver 584, a processor 586, and/or other subsystems or components 588. The memory device 500 can include features generally similar to those of the apparatus described above with reference to one or more of the FIGS, and can therefore include various features for performing a direct read request from a host device. The resulting system 580 can perform any of a wide variety of functions, such as memory storage, data processing, and/or other suitable functions. Accordingly, representative systems 580 can include, without limitation, hand-held devices (e.g., mobile phones, tablets, digital readers, and digital audio players), computers, vehicles, appliances and other products. Components of the system 580 may be housed in a single unit or distributed over multiple, interconnected units (e.g., through a communications network). The components of the system 580 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of NAND Flash devices. Apparatuses configured in accordance with other embodiments of the present technology, however, can include other types of suitable storage media in addition to or in lieu of NAND Flash devices, such as, devices incorporating NOR-based non-volatile storage media (e.g., NAND flash), magnetic storage media, phase-change storage media, ferroelectric storage media, dynamic random access memory (DRAM) devices, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage, or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to one or more of the FIGS. described above.

We claim:

1. A method of response completion pacing for latency control, the method comprising:
   determining that a pacing logic timer has expired, wherein the pacing logic timer tracks a cadenced duration for periodically sending command responses generated by a memory array to a host device; and
   sending a response from a ready response queue to the host device based on the determination that the pacing logic timer has expired and a number of responses in the ready response queue relative to a target number of responses.

2. The method of claim 1, further comprising:
   determining the number of responses in the ready response queue is less than the target number of responses in the ready response queue.

3. The method of claim 2, further comprising:
   in response to determining the number of responses in the ready response queue is less than the target number of responses in the ready response queue, determining that a time gap between when the response was sent and a current time, does not exceed a predetermined delay time; and
   resetting the pacing logic timer.

4. The method of claim 2, further comprising:
   in response to determining the number of responses in the ready response queue is less than the target number of responses in the ready response queue, determining that a time gap between when the response was sent and a current time exceeds a predetermined delay time; and
   sending a second response from the ready response queue to the host device.

5. The method of claim 1, further comprising:
   determining the target number of responses in the ready response queue based on a predetermined time gap between each response in the ready response queue and a depth of the ready response queue.

6. The method of claim 1, further comprising:
   determining that the target number of responses in the ready response queue exceeds the number of responses in the ready response queue; and
   adjusting a cadence period of output response completions.

7. A memory device, comprising:
   a ready response queue configured to store processing results generated by a memory array;
   a processing logic operably coupled to the ready response queue and configured to:
      determine that a pacing logic timer has expired, wherein the pacing logic timer tracks a cadenced duration for periodically sending command responses generated by the memory array to a host device; and
      send a response from the ready response queue to the host device based on the determination that the pacing logic timer has expired and a number of responses in the ready response queue relative to a target number of responses.

8. The memory device of claim 7, wherein the processing logic operably coupled to the ready response queue is configured to determine the number of responses in the ready response queue is less than the target number of responses in the ready response queue.

9. The memory device of claim 8, wherein the processing logic operably coupled to the ready response queue is configured to:
   in response to determining the number of responses in the ready response queue is less than the target number of responses in the ready response queue, determine that a time gap between when the response was sent and a current time, does not exceed a predetermined delay time; and
   reset the pacing logic timer.

10. The memory device of claim 8, wherein the processing logic operably coupled to the ready response queue is configured to:
    in response to determining the number of responses in the ready response queue is less than the target number of responses in the ready response queue, determine that a time gap between when the response was sent and a current time exceeds a predetermined delay time; and
    send a second response from the ready response queue to the host device.

11. The memory device of claim 7, wherein the processing logic operably coupled to the ready response queue is configured to:
    determine the target number of responses in the ready response queue based on a predetermined time gap between each response in the ready response queue and a depth of the ready response queue.

12. The memory device of claim 7, wherein the processing logic operably coupled to the ready response queue is configured to:
    determine that the target number of responses in the ready response queue exceeds the number of responses in the ready response queue; and
    adjust a cadence period of output response completions.

13. The memory device of claim 7, wherein the ready response queue is a first in first out (FIFO) queue, wherein the processing logic operably coupled to the ready response queue is configured to maintain the FIFO queue to hold and delay responses for completed commands according to one or more cadenced response timings.

14. A memory controller, comprising:
    a memory array including memory cells configured to store data;
    at least one processor coupled to the memory array;
    embedded memory coupled to the processor and storing instructions for execution by the at least one processor, the instructions comprising:
        determining that a pacing logic timer has expired, wherein the pacing logic timer tracks a cadenced duration for periodically sending command responses generated by the memory array to a host device; and
        sending a response from a ready response queue to the host device based on the determination that the pacing logic timer has expired and a number of responses in the ready response queue relative to a target number of responses.

15. The memory controller of claim 14, wherein the processor instructions include:
    determining the number of responses in the ready response queue is less than the target number of responses in the ready response queue.

16. The memory controller of claim 15, wherein the processor instructions include:
    in response to determining the number of responses in the ready response queue is less than the target number of responses in the ready response queue, determining that a time gap between when the response was sent and a current time, does not exceed a predetermined delay time; and
    resetting the pacing logic timer.

17. The memory controller of claim 15, wherein the processor instructions include:
    in response to determining the number of responses in the ready response queue is less than the target number of responses in the ready response queue, determining that a time gap between when the response was sent and a current time exceeds a predetermined delay time; and
    sending a second response from the ready response queue to the host device.

18. The memory controller of claim 14, wherein the processor instructions include:
    determining the target number of responses in the ready response queue based on a predetermined time gap between each response in the ready response queue and a depth of the ready response queue.

19. The memory controller of claim 14, wherein the processor instructions include:
    determining that the target number of responses in the ready response queue exceeds the number of responses in the ready response queue; and
    adjusting a cadence period of output response completions.

20. The memory controller of claim 14, wherein the ready response queue is a first in first out (FIFO) queue, wherein the processor instructions include maintaining the FIFO queue to hold and delay responses for completed commands according to one or more cadenced response timings.

* * * * *